Sept. 10, 1935.     B. W. MARKHAM ET AL     2,013,922
WEIGHING SCALE
Filed Jan. 11, 1933     3 Sheets-Sheet 1
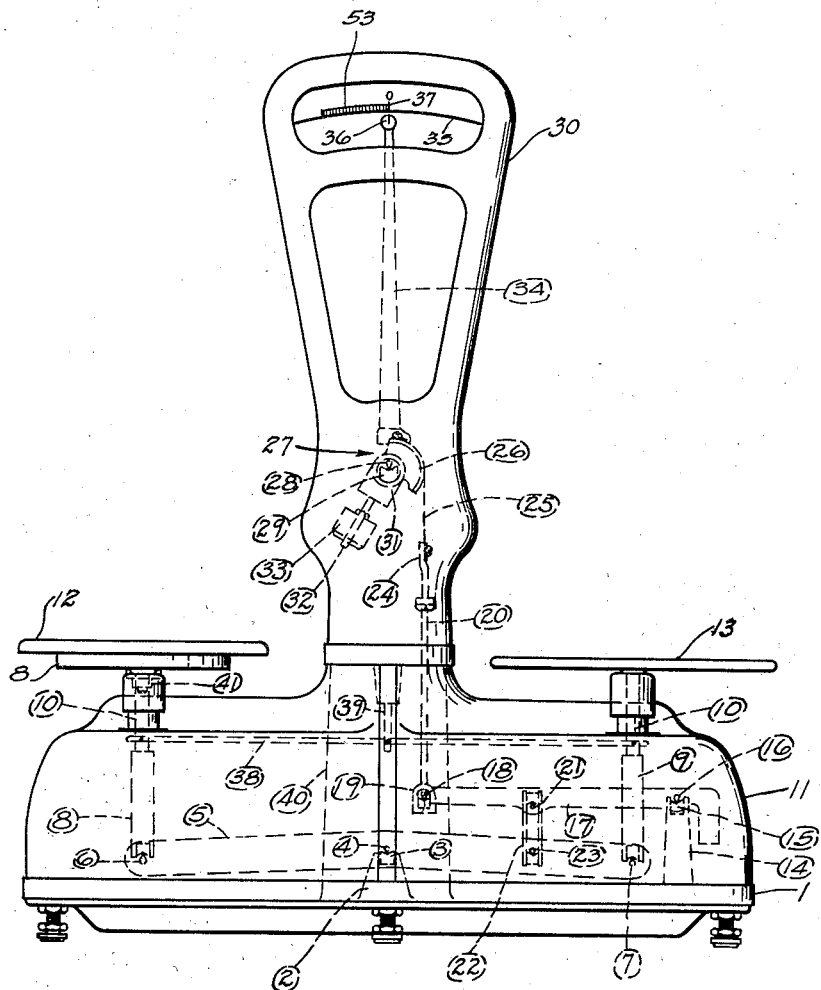
Fig. I
Fig. V
Blair W. Markham
Samuel N. Hurt
Inventors
By C.C. Marshall
Attorney Sept. 10, 1935. B. W. MARKHAM ET AL 2,013,922
WEIGHING SCALE
Filed Jan. 11, 1933 3 Sheets-Sheet 2
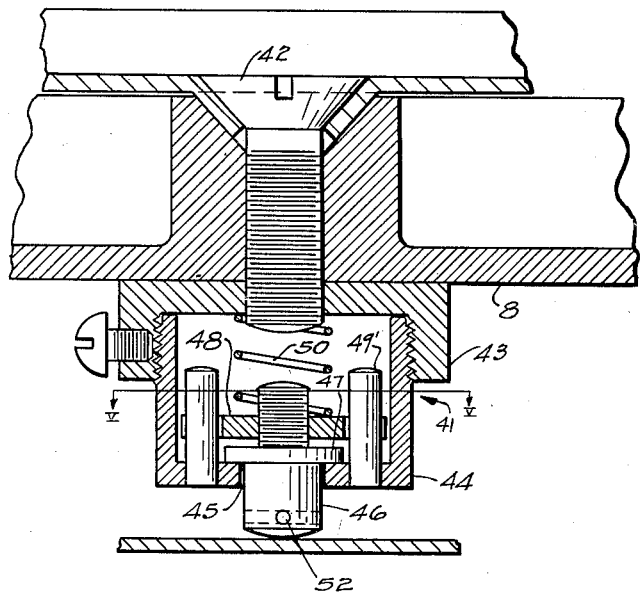
Fig. IV
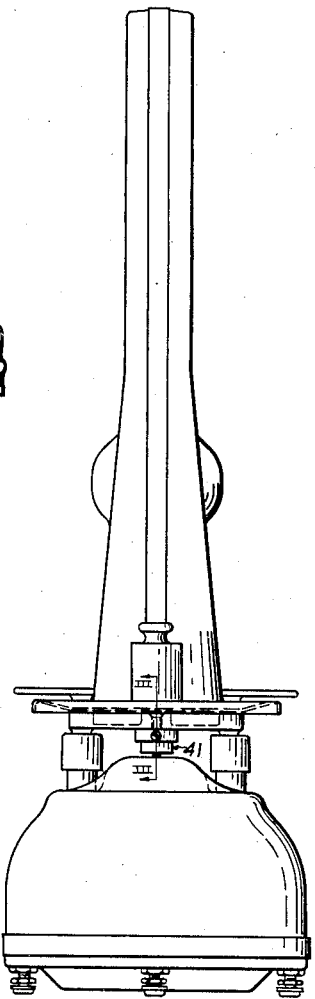
Fig. II
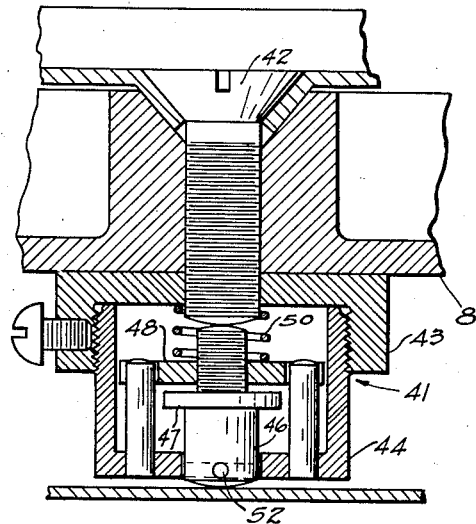
Fig. III
Blair W. Markham
Samuel N. Hurt
Inventors
By C. C. Marshall
Attorney

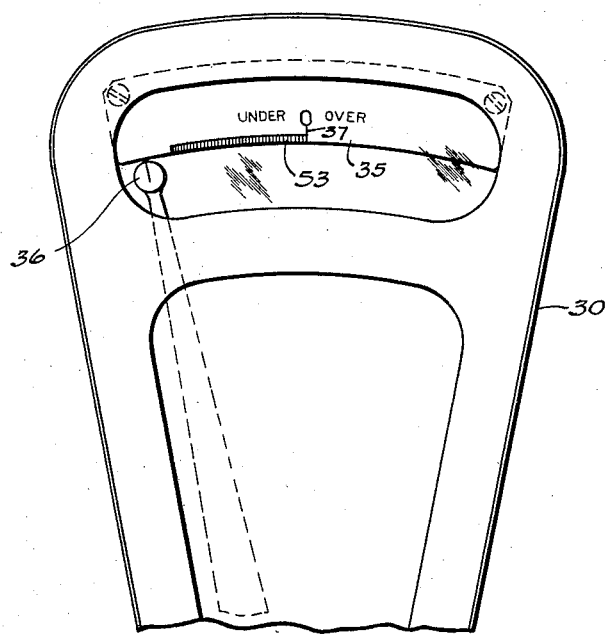
Fig. VI
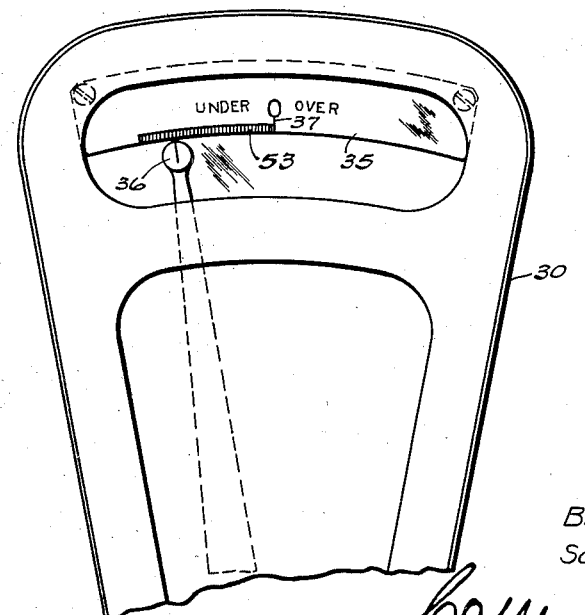
Fig. VII
Blair W. Markham
Samuel N. Hurt
INVENTORS

Patented Sept. 10, 1935

2,013,922

UNITED STATES PATENT OFFICE 2,013,922

WEIGHING SCALE

Blair W. Markham, Rochester, N. Y., and Samuel N. Hurt, Toledo, Ohio, assignors to Toledo Scale Manufacturing Company, Toledo, Ohio, a corporation of New Jersey Application January 11, 1933, Serial No. 651,144

3 Claims. (Cl. 265—59)

This invention relates generally to weighing scales and it resides more particularly in improved means which may be provided in scales of types which are largely employed in filling bags or packages with equal predetermined increments of commodity. When such a scale is back-weighted for a particular weight and the operator is filling a package, the scale generally gives notice of approaching balance when it is too late to stop the flow of the material in time and overweight is the result. This requires the operator to perform unnecessary manual operations to remove the excess commodity from the package. It will be readily seen that this slows up the work and increases its cost considerably. The embodiment of our invention is designed to eliminate this extra effort and monetary loss and, therefor, the invention has for its principal object the provision of improved means for giving a timely, visible indication of approaching balance of the weighing device.

Another object is the provision of improved means for causing an indicative movement of a part of the weighing scale without reactively influencing the weighing result.

A further object is the provision of improved means for causing a movement of the indicating hand when the amount of the commodity approaches its predetermined weight.

These and other objects and advantages will be apparent from the following description in which reference is had to the accompanying drawings illustrating a preferred embodiment of our invention and wherein similar reference numerals designate similar parts throughout the several views.

In the drawings:

Fig. I is a front elevational view of a typical scale to which we have shown the embodiment of our invention attached.

Figure II is an end elevational view thereof and

Figure III is an enlarged fragmentary sectional view through the counterbalancing weight platter substantially along the line III of Figure II and showing the embodiment of our invention in detail, the parts being shown in the compressed position.

Figure IV is a similar view showing the parts in the position they occupy immediately after imparting an indicative impulse, but before the total required amount of commodity is on the load receiver.

Figure V is a plan cross sectional view of the device illustrated in Figure IV being sectioned substantially along the line V—V of Figure IV.

Figure VI is an enlarged fragmentary, front elevational view of the indicating means showing in detail the relative positions of the chart indicator when the weighing device is back-weighted to weigh out predetermined amounts of material; and Figure VII is an enlarged fragmentary, front elevational view of the same parts of the weighing device, showing, however, the relative positions occupied by the parts after a predetermined portion of the predetermined amount of material has been placed on the scale.

Since the scale depicted is one fully shown and described in United States Patent No. 1,857,278 to H. O. Hem, we will describe it herein only so far as is necessary to fully disclose our invention.

Referring to the drawings in detail, a base 1 of rigid construction is provided with two upwardly extending bosses 2 having bearings 3 stationed in their upper ends. These bearings support fulcrum pivots 4 projecting laterally from the arms of a main lever 5. These arms are further equipped with load pivots 6 and 7 which are in spaced relation to the fulcrum and respectively support counterbalance weight platter spider 8 and commodity platter spider 9. Upwardly extending studs 10 fixed in these spiders project through openings in the top of a base casing 11 which completely surrounds and covers the lever mechanism. To these extending studs, counterbalance weight platter 12 and commodity platter 13 are securely fastened. Another pair of brackets 14 arise from the base 1, adjacent one of the ends of the lever 5, the upper ends of these brackets being bifurcated and having bearings 15 stationed therein upon which fulcrum pivots 16 of an auxiliary lever are resting. This lever extends horizontally towards the center of the scale and is provided near its end with a nose pivot 18 engaging a stirrup 19 fastened to a connecting rod 20. An additional pair of pivots 21 fixed in the lever 17 are connected by means of a connecting loop 22 to a pair of pivots 23 extending from the lever 5. The upper end of the connecting rod 20 is fastened by means of a suitable connection 24 to the lower end of a flexible metallic tape 25 whose upper end is fastened to and overlies an arcuate portion of a power sector 26 which forms a part of a load counterbalancing pendulum 27. This pendulum is fulcrumed by means of a pivot 28 upon suitable bearings 29 stationed in an upwardly extending indicator housing 30 and also consists of a pendulum body 31 having a depending stem 32 upon which a counterbalancing weight 33 is adjustably threaded. To the rear of the pendulum body 31 an indicating hand 34 is fastened which, projecting upwardly cooperates with a chart 35 positioned in the housing 30. A mark 36 on the indicator when in registry with a mark 37 on the chart 35 indicates the condition of balance of the scale.

To maintain the condition of level of the platters 12 and 13 a check link 38, which is centrally pivoted to a stud 39 depending from a tripod-like extension 40 of the base 1 is provided. The ends of the check link pivotally engage the spiders 8 and 9 respectively, and thus form a guiding parallelogram. The tripod-like extension 40 also serves to support the housing 30. The scale so far described is well adapted to determine predetermined loads.

To accomplish the objects of our invention primarily stated, we attach a capsule like member 41 to the under side of a member forming a part of the spider 8 (see Figure III) retaining it by a screw 42 which also retains the platter 12 to the spider 8 in the manner shown in the illustration and which requires no further explanation. The member 41 comprises a part 43 having a downwardly extending circular wall provided with an internal thread into which the lower member 44 is threaded. This lower member has an aperture 45 through which a portion of a plunger 46 projects. This plunger is provided with a collar-like shoulder 47 of greater diameter than the diameter of the aperture 45 to prevent the plunger passing through the aperture if accidentally disengaged from a pressure plate 48 into which a portion of this plunger is threaded. Rotation of this plate is prevented by two studs 49¹ driven into drilled holes in the bottom of the member 44 and projecting through peripheral slots 49. (Figure V.) A helical spring 50 is interposed between the inner surface of the member 43 and the surface of the pressure plate 48, which has normal bias to maintain the plunger 46 in projected position.

Assuming that a number of cartons are each to be filled with one pound of coffee, the operation of the device is as follows. The operator places a standard one-pound weight on the counter poise weight platter 12. The effect of this weight which is transmitted through the lever mechanism overbalances the pendulum 27 and the indicating hand 34 moves to the left in unison with the downward movement of the counter poise platter until the projecting portion of the plunger 46 engages the top of the base casing 11, the spring 50 being of such stiffness that it will be compressed. The relative position which the parts then occupy is shown in Figure IV. The carton which is to be filled with coffee is placed on the other or commodity receiver 13, its tare weight is compensated for by placing a similar empty container on the counterpoise platter. The operator now starts to pour coffee into the carton; this he may do by hand, by means of a manually controlled filling hopper or any other convenient means. When sufficient quantity of coffee has accumulated in the carton so that it nearly balances the counterpoise, its weight (acting on the opposite side of the lever) is sufficient to release the energy stored up by the compressed spring 50, expanding this spring and since the plunger 46 is resting against the cover 11 the counterpoise platter 12 is raised. The indicator 34 being operatively connected to the platter is thereby given an impulse which moves it slightly towards the zero indicium 37 of the chart 35 and thus visibly indicates that the amount of commodity accumulating on the load receiver is approaching the predetermined amount. The operator being thus notified is enabled to reduce the stream of the material flowing into the carton to a mere dribble which may instantly stop when the mark 36 on the indicator 34 registers with the mark 37 on the chart. Overweight and the accompanying extra expense are thereby eliminated since none of the material in the carton need be removed.

The amount of commodity which must be placed into the carton to cause this indicative movement of the indicator may be predetermined by adjusting the compression of the spring 50. For this purpose the plunger 46 is provided with a number of cross drilled holes 52 into which a small rod or nail may be inserted and the tension of the spring adjusted by changing the relative height of the pressure plate 48 by means of the threaded portion of the plunger, thus increasing or decreasing the pressure with which the spring 50 presses against the plate 48; although the embodiment of our invention so far described is sufficient to fulfill the principal object of our invention, an inattentive operator might overlook the indicative movement of the indicator, we, therefor, provide means whereby the operator may at any time tell whether this indicative movement has taken place, for this purpose we place an additional indicium 53 on the chart 35 in a position to the right of the indicator when the spring 50 is compressed. (See Figure VI.) The indicium 53 is in the form of a colored band and its position on the chart is so predetermined that when the indicative movement of the indicator has taken place the mark 36 will be in registration therewith. (See Figure VII.) This condition will continue to exist until exact balance is indicated by the registry of the marks 36 and 37. At this time the capsule-like member is entirely disengaged from the base cover 11 and its mechanism has no reactive influence on the weighing result.

The embodiment of our invention herein shown and described is to be regarded as illustrative only and it is to be understood that the invention is susceptible to variation, modification, and change within the spirit and scope of the sub-joined claims.

Having described our invention, we claim:

1. In a device of the class described, in combination, weighing mechanism comprising a main lever, counterbalance poise and commodity receivers mounted thereon, an indicator, means for operatively connecting said main lever and said indicator, a cover for enclosing said main lever and a member secured below said counterbalance weight receiver and exteriorly of said cover for acting on said lever mechanism when a predetermined amount of commodity has been deposited on said commodity receiver, the mechanism of said member being enclosed in a capsule like container.

2. In a device of the class described, in combination, weighing mechanism comprising a main lever, counterbalance poise and commodity receivers mounted thereon, an indicator, means for operatively connecting said main lever and said indicator, a cover for enclosing said main lever and a member secured below said counterbalance poise receiver and exteriorly of said cover for acting on said lever mechanism when a predetermined amount of commodity has been deposited on said commodity receiver, the mechanism of said member being enclosed in a capsule like container, and comprising a plunger adapted to project through an aperture in said capsule like container and contact said cover.

3. In a device of the class described, in combination, weighing mechanism comprising a main lever, counterbalance poise and commodity receivers mounted thereon, an indicator, means for operatively connecting said main lever and said indicator, a cover for enclosing said main lever and a member secured below said counterbalance poise receiver and exteriorly of said cover for acting on said lever mechanism when a predetermined amount of commodity has been deposited on said commodity receiver, the mechanism of said member being enclosed in a capsule like container, comprising a plunger adapted to project through an aperture in said capsule like container and contact said cover, and resilient means having a normal bias to maintain said plunger in projected position.

BLAIR W. MARKHAM.
SAMUEL N. HURT.